US012158258B1

(12) United States Patent
Thompson

(10) Patent No.: US 12,158,258 B1
(45) Date of Patent: Dec. 3, 2024

(54) SOLAR LIGHT HOLDER

(71) Applicant: Errol Thompson, Rialto, CA (US)

(72) Inventor: Errol Thompson, Rialto, CA (US)

( * ) Notice: Subject to any disclaimer, the term of this patent is extended or adjusted under 35 U.S.C. 154(b) by 0 days.

(21) Appl. No.: 18/640,198

(22) Filed: Apr. 19, 2024

(51) Int. Cl.
*F21V 21/22* (2006.01)
*F21S 6/00* (2006.01)
*F21W 131/109* (2006.01)

(52) U.S. Cl.
CPC .............. *F21V 21/22* (2013.01); *F21S 6/004* (2013.01); *F21W 2131/109* (2013.01)

(58) Field of Classification Search
CPC ................................. F21V 21/22; F21S 6/004
See application file for complete search history.

(56) References Cited

U.S. PATENT DOCUMENTS 111,360 A * 1/1871 Macqueen ............. F21V 21/22 362/419
3,906,664 A 9/1975 Hall
5,072,345 A * 12/1991 Goggia ................... F21V 21/15 362/153.1
5,088,680 A 2/1992 Farmer
5,155,667 A * 10/1992 Ho .......................... E01F 9/615 362/418
5,425,526 A * 6/1995 Shen ....................... F21V 21/22 267/132
6,789,916 B2 9/2004 Ruggles
D508,581 S 8/2005 Cheong
9,115,507 B2 8/2015 Wyrostek
D934,554 S 11/2021 Chen
2014/0145046 A1 5/2014 Layne
2016/0069549 A1 3/2016 Cox

FOREIGN PATENT DOCUMENTS

WO WO2011043833 4/2011

* cited by examiner

*Primary Examiner* — Thomas M Sember

(57) ABSTRACT

A lawn lamp holder for removably mounting lawn lamps in a ground surface includes a base which comprises a shell and a weighted material which is contained in an interior space defined by the shell. A tube is coupled to and extends away from a top end of the base. The tube defines a channel therein and has an open end opposite the base which extends into the channel. The channel is sized to receive a post of a lawn lamp therein through the open end.

9 Claims, 5 Drawing Sheets

SOLAR LIGHT HOLDER

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to lawn lamp holders and more particularly pertains to a new lawn lamp holder for removably mounting lawn lamps in a ground surface.

(2) Description of Related Art Including Information Disclosed Under 37 CFR 1.97 and 1.98

The prior art describes myriad supports for lamps but fails to disclose such an apparatus which has a weighted base that may be inserted into a hole in the ground and include securing means to removably couple a lawn lamp to the apparatus.

BRIEF SUMMARY OF THE INVENTION

An embodiment of the disclosure meets the needs presented above by generally comprising a base which comprises a shell and a weighted material which is contained in an interior space defined by the shell. A tube is coupled to and extends away from a top end of the base. The tube defines a channel therein and has an open end opposite the base which extends into the channel. The channel is sized to receive a post of a lawn lamp therein through the open end.

Another embodiment of the disclosure includes a method of securing a lawn lamp in a ground surface. The method comprises forming a hole in the ground surface, positioning a base of a lawn lamp holder in the hole such that a tube attached to the base is oriented to extend upwardly from the base, and poitioning a post of the lawn lamp in a channel formed by the tube. The post is slid into the channel via an open end of the tube. The lawn lamp may further be secured to the lawn lamp holder by a securement member.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
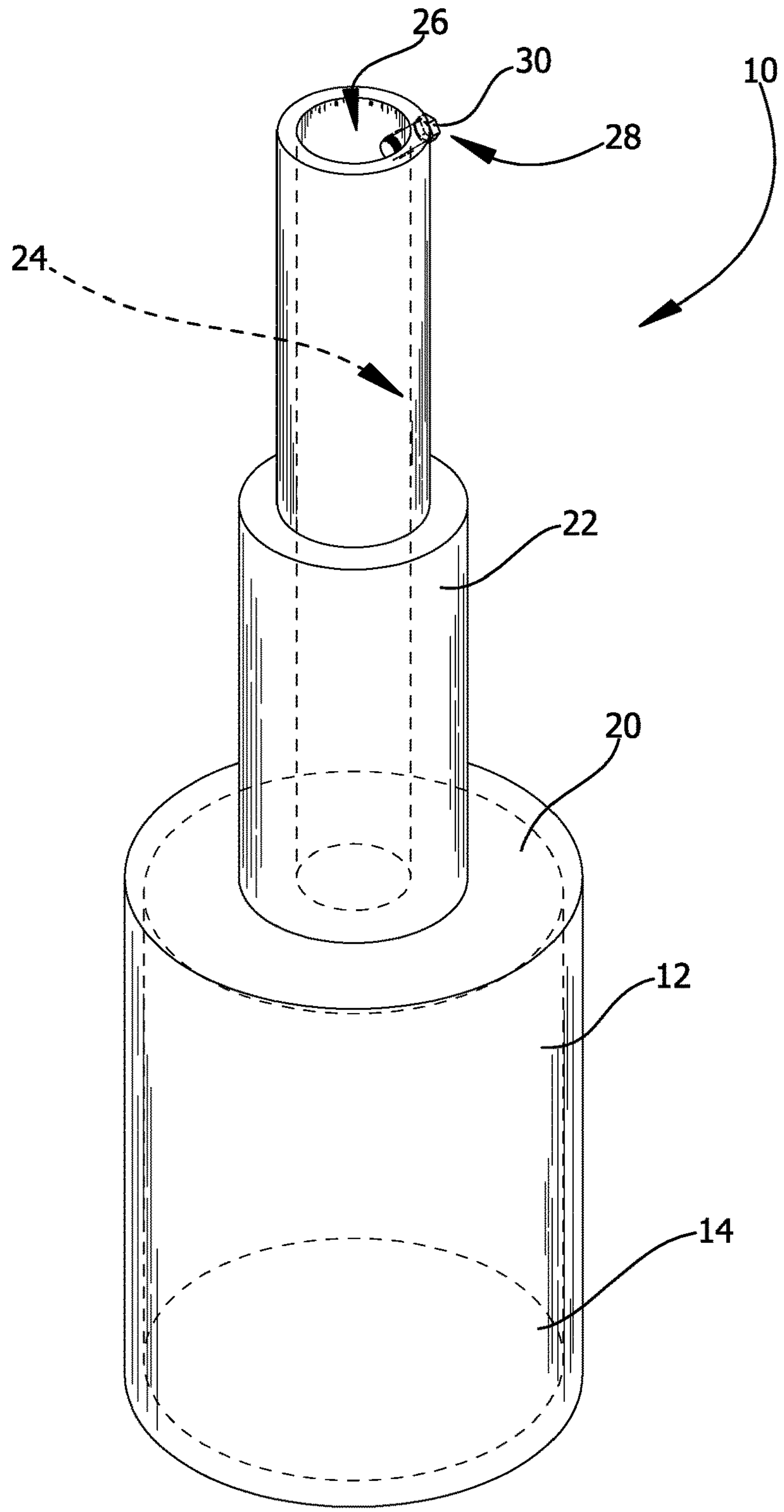
FIG. 1 is a perspective view of a lawn lamp holder according to an embodiment of the disclosure.
Figure 2:
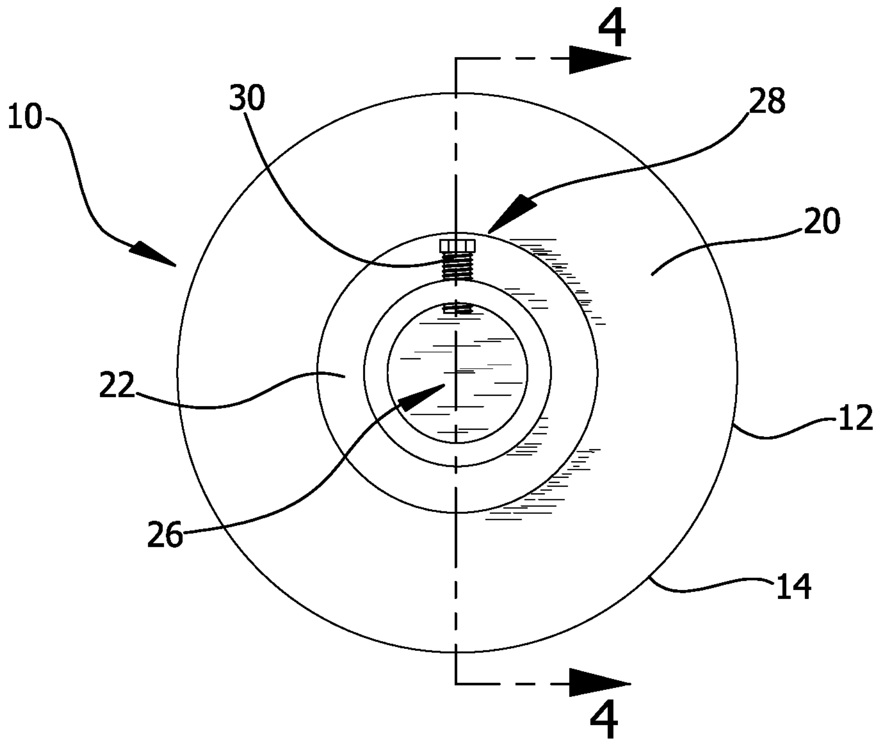
FIG. 2 is a top view of an embodiment of the disclosure.
Figure 3:
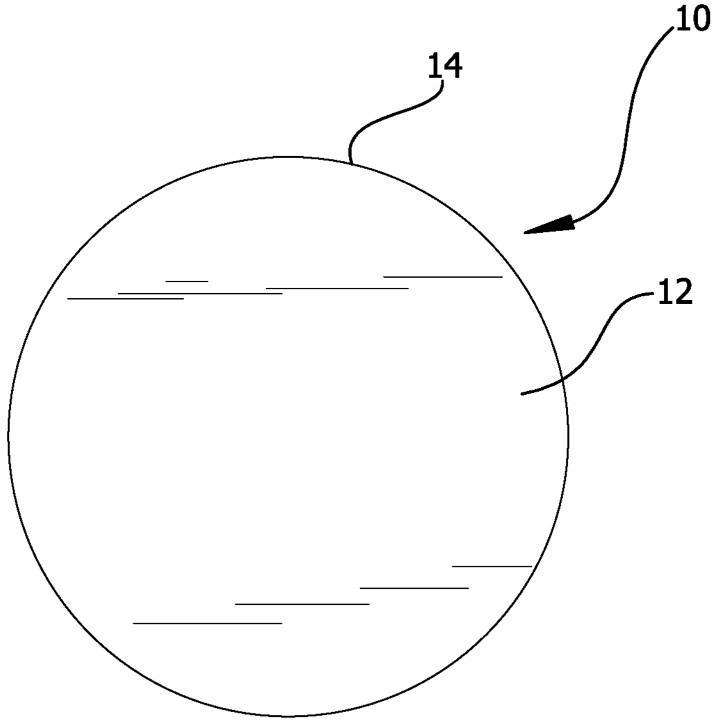
FIG. 3 is a bottom view of an embodiment of the disclosure.
Figure 4:
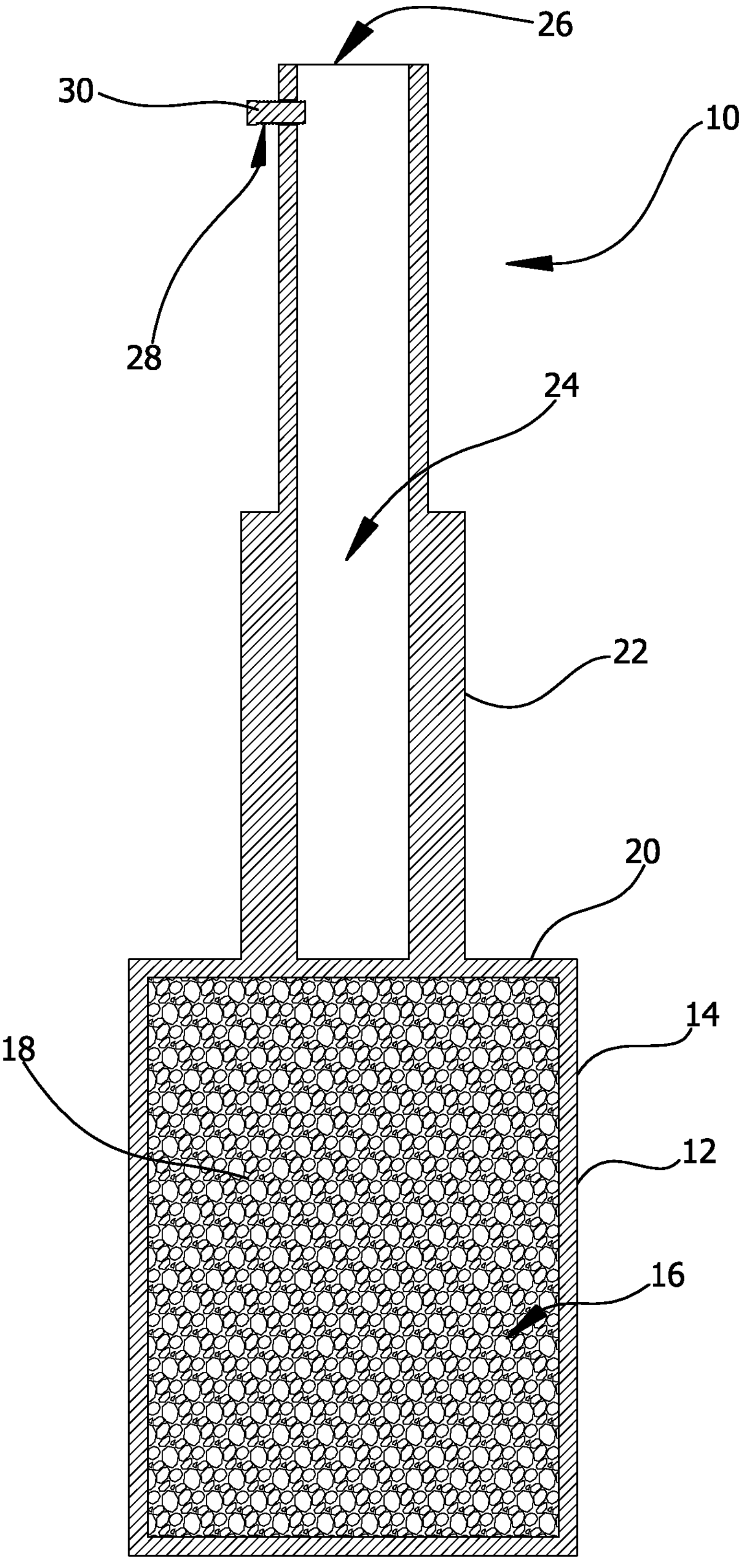
FIG. 4 is a cross-section view of an embodiment of the disclosure taken from Line 4-4 in FIG. 2.

With reference now to the drawings, and in particular to FIGS. 1 through 6 thereof, a new lawn lamp holder embodying the principles and concepts of an embodiment of the disclosure and generally designated by the reference numeral 10 will be described.

As best illustrated in FIGS. 1 through 6, the lawn lamp holder 10 generally comprises a base 12 which comprises a shell 14 and a weighted material 18. The weighted material 18 is contained in an interior space 16 defined by the shell 14. The weighted material 18 may be sand, concrete, or any suitable material for weighing the base 12 down. A tube 22 is coupled to and extends away from a top end 20 of the base 12. The tube 22 defines a channel 24 therein and has an open end 26 opposite the base 12 which extends into the channel 24. A width of the channel 24 is complementary in size to a width of a post 34 of a lawn lamp 32 such that the post 34 may be slid into the channel 24 of the tube 22 via the open end 26. The tube 22 and the shell 14 of the base 12 have cylindrical shapes and are positioned concentrically to each other. The tube 22 is also formed integrally to the shell 14 of the base 12, which may be a polymer such as polyvinyl chloride, acrylic, polycarbonate, or the like, a metal, a wood, or any other suitable material.

A securement member 28 is coupled to the tube 22 proximate the open end 26 which is configured to engage the lawn lamp 32 to secure the lawn lamp 32 with respect to the tube 22. The securement member 28 comprises a set screw 30 which threadedly engages the tube 22 and is movable alternately in and out of the channel 24 of the tube 22 by rotating the set screw 30 in opposite rotational directions. In other embodiments, the securement member 28 may be a locking pin, a clamp, a latch, or any other suitable fastener.

Figure 5:
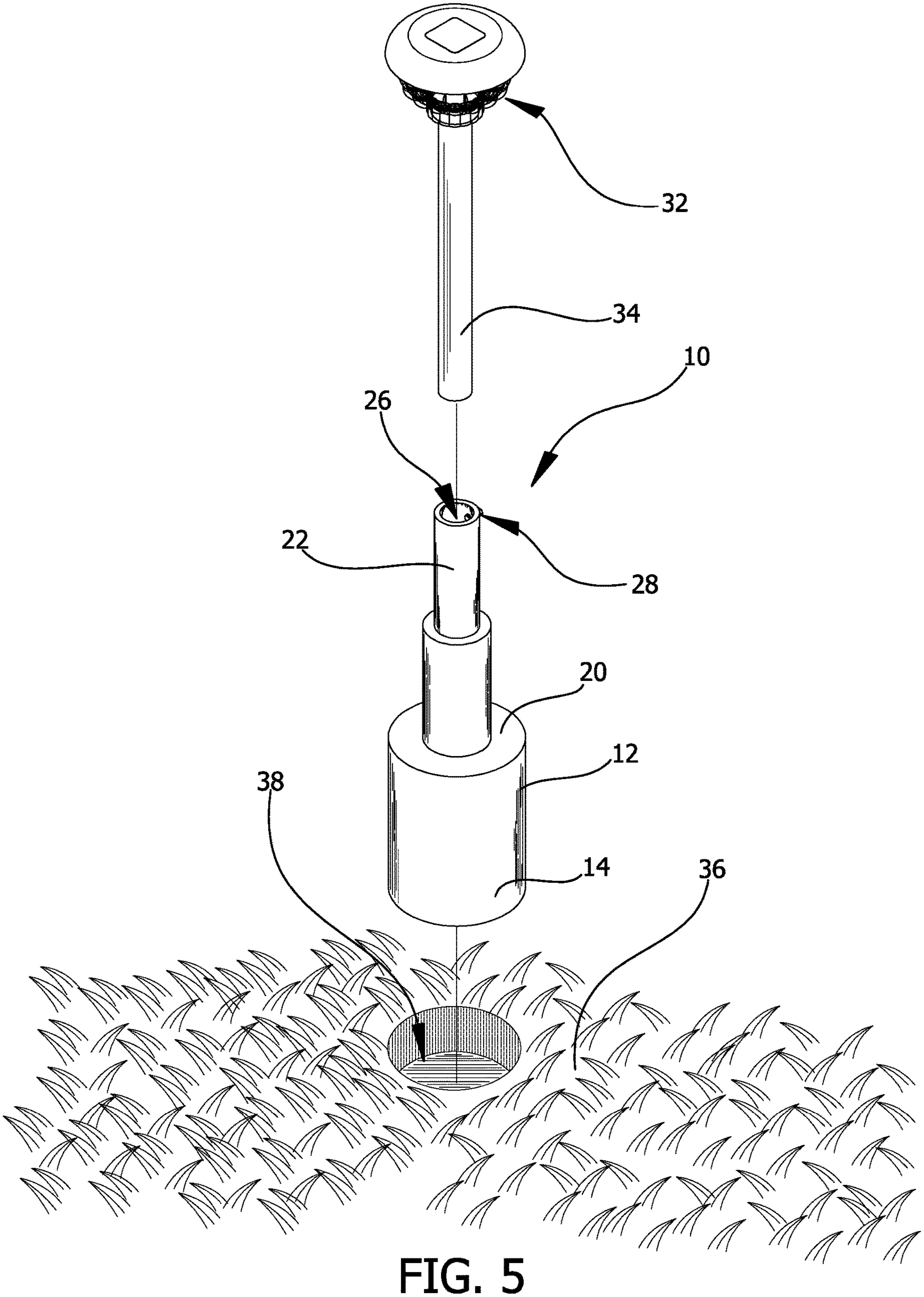
FIG. 5 is an exploded in-use view of an embodiment of the disclosure.
Figure 6:
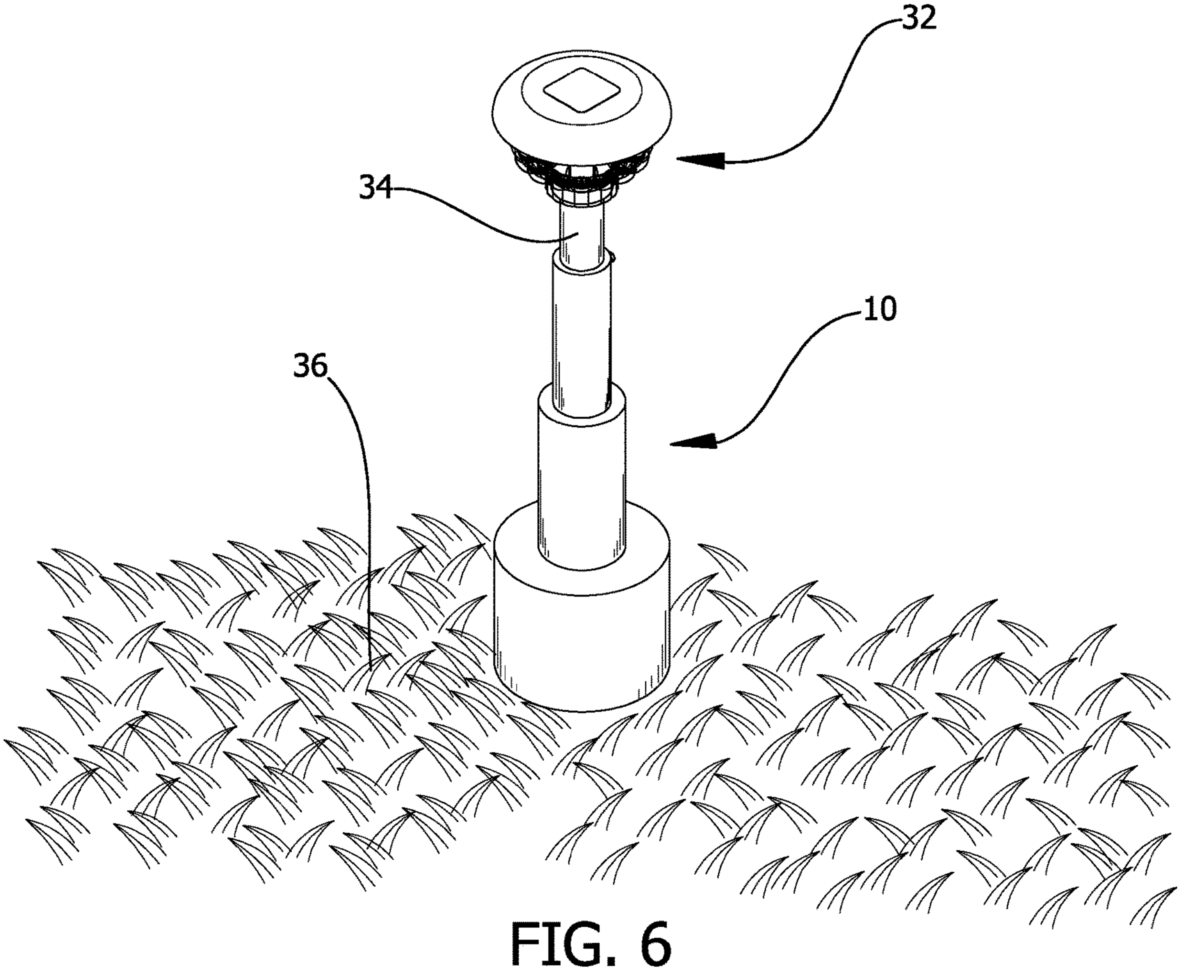
FIG. 6 is an in-use view of an embodiment of the disclosure.

With reference to FIGS. 5 and 6, the lawn lamp holder 10 is used by positioning the base 12 in a hole 38 in a ground surface 36 which has a cylindrical shape and a complementary size to the base 12. In this manner, the lawn lamp holder 10 may be rotated in the hole 38 to adjust an orientation of the lawn lamp holder 10 without altering the shape of the hole 38 or marring a surrounding soil. The base 12 may extend past the ground surface 36 when placed in the hole 38 so that a first portion of the base 12 is below the ground surface 36 and a second portion of the base 12 is above the ground surface 36.

The lawn lamp 32 is slid through the open end 26 of the tube 22 into the channel 24. An orientation of the lawn lamp 32 with respect to the lawn lamp holder 10 is adjustable by rotating the lawn lamp 32 in the channel 24. The lawn lamp 32 may be secured in a selected position in the channel 24 via the securement member 28. The lawn lamp holder 10 may be rotated in the hole 38 after the lawn lamp 32 has been secured to the tube 22 to orient both the lawn lamp 32 and the lawn lamp holder 10 with respect to the ground surface 36 and surrounding features.

The lawn lamp 32 may be removed from the lawn lamp holder 10 to prevent damage to the lawn lamp 32 or replace it. Lawn lamps powered by a solar panel, a battery, or the like may be held by the lawn lamp holder 10. Lawn lamps with electrical cords or other features may be held by embodiments with holes, slots, or similar elements which accommodate such features.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A lawn lamp holder comprising:

a base comprising a shell and a weighted material, the weighted material being contained in and fully filling an interior space defined by the shell; and a tube integrally coupled to and extending away from a top end of the base, the tube defining a channel therein extrinsic and distinct from the interior space, the tube having a fixed length extending away from the base, the tube having an open end opposite the base which extends into the channel, the channel being sized to receive a post of a lawn lamp therein through the open end.

2. The lawn lamp holder of claim 1, wherein the shell has a cylindrical shape.

3. The lawn lamp holder of claim 2, wherein the tube has a cylindrical shape, the tube being positioned concentrically to the base.

4. The lawn lamp holder of claim 1, wherein the tube has a cylindrical shape.

5. The lawn holder of claim 1, wherein a width of the tube is less than a width of the base.

6. The lawn lamp holder of claim 1, wherein a width of the channel is configured to be complementary in size to a width of the post.

7. The lawn lamp holder of claim 1, further comprising a securement member coupled to the tube proximate the open end, the securement member being configured to engage the lawn lamp to secure the lawn lamp with respect to the tube.

8. The lawn lamp holder of claim 7, wherein the securement member comprises a set screw which threadedly engages the tube, the set screw being movable alternately in and out of the channel of the tube by rotating the set screw in opposite rotational directions.

9. A lawn lamp holder comprising:

a base comprising a shell and a weighted material, the weighted material being contained in and fully filling an interior space defined by the shell, the shell having a cylindrical shape;

a tube coupled to and extending away from a top end of the base, the tube defining a channel therein extrinsic and distinct from the interior space, the tube having a fixed length extending away from the base, the tube having an open end opposite the base which extends into the channel, the channel being sized to receive a post of a lawn lamp therein through the open end, a width of the tube being less than a width of the base, a width of the channel being configured to be complementary in size to a width of the post, the tube having a cylindrical shape, the tube being positioned concentrically to the base, the tube being integrally formed with the shell of the base; and a securement member coupled to the tube proximate the open end, the securement member being configured to engage the lawn lamp to secure the lawn lamp with respect to the tube, the securement member comprising a set screw which threadedly engages the tube, the set screw being movable alternately in and out of the channel of the tube by rotating the set screw in opposite rotational directions.

* * * * *